(12) United States Patent
Takamatsu et al.

(10) Patent No.: US 8,727,258 B2
(45) Date of Patent: May 20, 2014

(54) WEBBING WINDING DEVICE

(75) Inventors: Hitoshi Takamatsu, Aichi-ken (JP); Akira Sumiyashiki, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 543 days.

(21) Appl. No.: 13/008,972

(22) Filed: Jan. 19, 2011

(65) Prior Publication Data

US 2011/0174911 A1 Jul. 21, 2011

(30) Foreign Application Priority Data

Jan. 21, 2010 (JP) ................................ 2010-010946

(51) Int. Cl.
*B60R 22/38* (2006.01)

(52) U.S. Cl.
USPC .................. 242/382.2; 242/384.2; 242/384.5; 242/384.6

(58) Field of Classification Search
USPC ........... 242/382.2, 383.4, 384.2, 384.5–384.6
See application file for complete search history.

(56) References Cited

U.S. PATENT DOCUMENTS

| | | | | |
|---|---|---|---|---|
| 6,732,967 | B2 * | 5/2004 | Sumiyashiki | 242/376 |
| 7,744,030 | B2 * | 6/2010 | Sumiyashiki | 242/383.1 |
| 7,883,045 | B2 * | 2/2011 | Yamada | 242/383.4 |
| 2008/0191083 | A1 * | 8/2008 | Sumiyashiki | 242/382.2 |

FOREIGN PATENT DOCUMENTS

| | | |
|---|---|---|
| JP | 62145761 | 9/1987 |
| JP | 6-8122 | 2/1994 |

OTHER PUBLICATIONS

Japanese Office Action dated Apr. 16, 2013.

* cited by examiner

*Primary Examiner* — Sang Kim
(74) *Attorney, Agent, or Firm* — Roberts Mlotkowski Safran & Cole P.C.

(57) ABSTRACT

Provided is a webbing winding device having a lock mechanism in which a driven body is less influenced by an inclination of a driving body. A peripheral wall extends from an edge portion of a penetration hole formed at a sensor gear constituting the lock mechanism toward a link member, and a guide hole is formed at a bottom wall formed at the front end of the peripheral wall. An engagement pin of the link member passes through the guide hole from the base end portion rather than the front end portion thereof in the protruding direction. Further, in the front end side of the engagement pin passing through and protruding from the guide hole, the outer peripheral portion is spaced apart from the inner peripheral portion of the peripheral wall.

5 Claims, 3 Drawing Sheets

US 8,727,258 B2

WEBBING WINDING DEVICE

CROSS-REFERENCE TO RELATED APPLICATION

This application claims priority under 35 USC 119 from Japanese Patent Application No. 2010-010946 filed Jan. 21, 2010, the disclosure of which is incorporated by reference herein.

BACKGROUND

1. Technical Field

The present invention relates to a webbing winding device that constitutes a safety belt device of a vehicle.

2. Related Art

In a so-called vehicle seat belt retractor disclosed in Japanese Utility Model Application Laid-Open (JU-A) No. H06-8122, when a winding shaft rapidly rotates in an extracting direction due to a tension applied to a webbing, a latch cup also rotates in the extracting direction because a lock portion of a lock member meshes with an internal tooth of a latch cup. As such, when the latch cup rotates in such way, an inner peripheral portion of an elongated hole-shaped pole guide formed at the latch cup presses a pole guide protrusion so as to rotate a pole. The rotating pole allows the engagement portion thereof to engage with a latch plate provided in the winding shaft, thereby regulating the rotation of the winding shaft in the extracting direction.

In the above-described configuration in which a protrusion such as the pole guide protrusion is inserted into an elongated hole such as the pole guide hole and an inner peripheral portion of the elongated hole presses an outer peripheral portion of the protrusion portion so as to transmit the movement, it sometimes happens that, for example, if either one provided with the elongated hole (the latch cup of JU-A No. H06-8122) is inclined in a manner such that the opening direction of the elongated hole is inclined with respect to the protruding direction of the protrusion portion, the inner peripheral portion of the elongated hole presses the front end of the protrusion and thus a force acts in a direction in which the one provided with the protrusion (the pole of JU-A No. H06-8122) is forcedly inclined.

In this way, there are cases that the movement may be transmitted from one provided with the elongated hole (the latch cup of JU-A No. H06-8122) to the other one provided with the protrusion (the pole of JU-A No. H06-8122) in the state in which the one provided with the elongated hole and the other one provided with the protrusion are inclined.

SUMMARY

The invention is made in view of the above-described circumstances, and provides a webbing winding device having a lock mechanism in which a driven body is less influenced from an inclination of a driving body.

A webbing winding device according to a first aspect of the invention includes a spool that fixes a base end portion of an elongated webbing belt in a longitudinal direction, and rotates in a winding direction so as to allow the webbing belt to wind around the spool from the base end portion of the webbing belt in the longitudinal direction; a regulation member that rotates, so as to directly or indirectly engage with the spool, by a predetermined angle toward a position at which the regulation member directly or indirectly engages with the spool, and that regulates the rotation of the spool in an extracting direction opposite to the winding direction; a rotation member that is operated to connect the spool and the rotation member in a connection state of at least one of two cases, one case being a case in which the spool rotates in the extracting direction at a predetermined spool acceleration or more in accordance with extraction of the webbing belt from the spool and the other case being a case in which a vehicle is decelerated at a predetermined vehicle acceleration or more, and that rotates in a predetermined direction in accordance with rotation transmitted from the spool in the connection state; and a link member that mechanically connects the rotation member and the regulation member to each other, and transmits rotation of the rotation member in the extracting direction to the regulation member so as to rotate the regulation member in a direction of enabling direct or indirect engagement with the spool.

According to the webbing winding device of the first aspect of the invention, the rotation member is connected to the spool if at least one of the following cases occurs: the vehicle is rapidly decelerated and the acceleration at that time exceeds a predetermined magnitude, or the webbing belt is extracted from the spool and the rotation acceleration of the spool rotating in the extracting direction exceeds a predetermined magnitude. In such a state, the rotation of the spool is transmitted to the rotation member, so that the rotation member rotates in the predetermined direction.

The link member is connected to the rotation member, and the rotation of the rotation member is transmitted to the link member, so that the link member rotates. In addition, the link member is connected to the regulation member, and the rotation of the rotation member is transmitted to the regulation member via the link member. The regulation member rotates in a direction in which it directly or indirectly engages with the spool. When the regulation member rotates by a predetermined angle in this way, the regulation member directly engages with the spool or indirectly engages with the spool via other members so as to regulate the rotation of the spool in the extracting direction. Accordingly, extraction of the webbing belt from the spool is regulated.

Here, even when the rotation member is displaced so that the central axis line of the rotation member is inclined, the displacement of the link member—that is, the inclination of the central axis line—is suppressed by a support means that supports the link member. For this reason, even when displacement of the rotation member occurs—that is, even when inclination of the central axis of the rotation member occurs—the rotation may be smoothly transmitted from the link member to the regulation member without a great change in relative positional relationship between the link member and the regulation member.

A webbing winding device according to a second aspect, in the first aspect of the invention, further includes: a protrusion that is formed at one of a driving body or a driven body to protrude therefrom toward the other of the driving body or the driven body, the driving body being disposed on one of the rotation member, the link member, or the regulation member at an upstream side relative to the rotation transmission, and the driven body being rotated by rotation directly transmitted from the driving body; and a hole that is formed at the other of the driving body or the driven body so that the protrusion is inserted into the hole, wherein the protrusion or the hole is provided so that an inner peripheral portion of the hole contacts an outer peripheral portion of the protrusion at a base end portion of the protrusion rather than a front end portion of the protrusion.

According to the webbing winding device of the second aspect of the invention, either one of the driving body or the driven body has a protrusion which protrudes toward the other of the driving body or the driven body. The driving body is disposed at an upstream side relative to rotation transmission and the rotation (pivoting motion) of the driving body is directly transmitted to the driven body, where the driving body and the driven body are any of the rotation member, the link member, or the regulation member. The protrusion formed at the one of the driving body or the driven body is inserted into the hole formed at the other of the driving body or the driven body.

For this reason, when the driving body rotates, of the outer peripheral portion of the protrusion and the inner peripheral portion of the hole, the one formed at the driving body presses the other one formed at the driven body. Accordingly, the rotation of the driving body is transmitted to the driven body.

Here, in the webbing winding device according to the invention, the protrusion or the hole is set so that the inner peripheral portion of the hole contacts the outer peripheral portion of the protrusion at the base end portion of the protrusion rather than at the front end portion of the protrusion. For this reason, even when the driving body is relatively displaced with respect to the driven body and thus a protruding direction of the protrusion is inclined with respect to an opening direction of the hole, the front end side of the protrusion does not interfere with the inner peripheral portion of the hole or the front end side of the protrusion only slightly interferes with the inner peripheral portion of the hole. For this reason, inclination of the driven body attributable to the inclined driving body is prevented or suppressed.

A webbing winding device according to a third aspect of the invention, in the second aspect of the invention, further includes a hole defining wall that is formed at the hole; and a connection portion that is formed at the one of the driving body or the driven body that has the hole so as to be directed toward the one of the driving body or the driven body that has the protrusion, the hole defining wall being formed at a front end side of the connection portion rather than a base end portion of the connection portion, wherein the connection portion is provided such that the connection portion is spaced apart from the outer peripheral portion of the protrusion passing through the hole.

According to the webbing winding device of the third aspect of the invention, the connection portion is formed at the one of the driving body or the driven body at which the hole is formed. The connection portion is formed from the one at which the hole is formed so as to be directed toward the one of the driving body or the driven body at which the protrusion is formed. The hole defining wall is formed at the front end of the connection portion (at the side of the one of the driving body or the driven body at which the protrusion is formed) and the hole is formed so that the protrusion is inserted into the hole defining wall.

Since the connection portion extends toward the one of the driving body or the driven body at which the protrusion is formed, a bottom portion formed at the front end side thereof is closer to the one of the driving body or the driven body at which the protrusion is formed than to the base end portion of the connection portion. Accordingly, the base end portion of the protrusion may pass through the hole rather than the front end portion of the protrusion.

Further, the connection portion is spaced apart from the outer peripheral portion of the protrusion which protrudes out from the hole. For this reason, even when the driving body is relatively inclined with respect to the driven body so that the protruding direction of the protrusion is inclined with respect to the opening direction of the hole, the front end side of the protrusion does not interfere with the connection portion or the front end side of the protrusion only slightly interferes with the connection portion. For this reason, either it never happens that the driven body is inclined by the inclined driving body, or the inclination of the driven body is suppressed.

A webbing winding device according to a fourth aspect of the invention, in the second aspect of the invention further includes a clutch member that is operated to connect the spool and the rotation member to each other when a vehicle is decelerated at the predetermined vehicle acceleration or more or the spool rotates in the extracting direction at the predetermined spool acceleration or more, wherein a connection position of the driving body and the driven body is set within a range of the thickness of the clutch member.

According to the webbing winding device of the fourth aspect of the invention, the clutch member connects the spool to the rotation member when the vehicle is rapidly decelerated or the spool rotates in the extracting direction at the predetermined spool acceleration or more. Accordingly, the rotation member rotates together with the spool so as to operate a lock pawl and to regulate the rotation of the spool in the extracting direction.

Here, in the webbing winding device according to the invention, the connection position of the driving body and the driven body is set within the range of the thickness of the clutch member (in other words, the rotation radial direction side of the rotation member with respect to the clutch member). For this reason, the transmission of the rotation from the clutch member to the rotation member and the transmission of the rotation from the driving body to the driven body are performed on substantially the same plane, and the displacement of the transmission path of the rotation force in the direction of the central axis line of the spool is zero or small. Accordingly, a difference in transmission of the rotation between the respective components may be effectively suppressed.

BRIEF DESCRIPTION OF THE DRAWINGS

Exemplary embodiments of the present invention will be described in detail based on the following figures, wherein.

DETAILED DESCRIPTION

<Configuration of Exemplary Embodiment>

Figure 1:
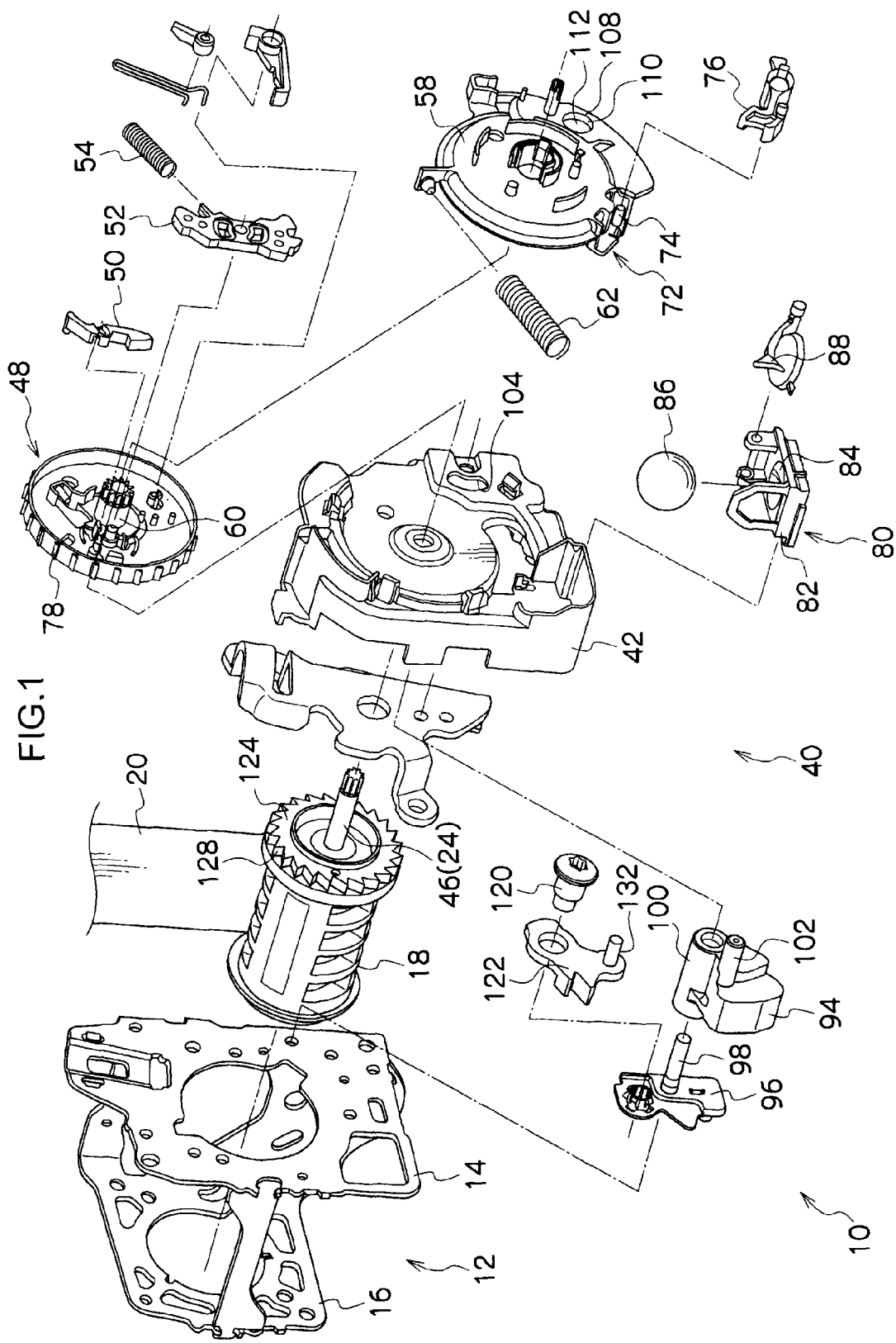
FIG. 1 is an exploded perspective view schematically illustrating a configuration of a webbing winding device according to an exemplary embodiment of the invention.

FIG. 1 is a front cross-sectional view schematically illustrating the entire configuration of a webbing winding device 10 according to an exemplary embodiment of the invention.

As shown in the figure, the webbing winding device 10 includes a frame 12. The frame 12 includes a pair of bridge plates 14 and 16 facing each other in the substantially longitudinal direction of a vehicle. A spool 18 is provided between the bridge plates 14 and 16. The spool 18 is formed in a substantially cylindrical shape in a manner such that the axial direction of the spool 18 is aligned with the facing direction of the bridge plates 14 and 16.

A longitudinal base end side of an elongated band-shaped webbing belt 20 is fixed to the spool 18. When the spool 18 rotates in a winding direction as one direction of directions with the central axis line of the spool 18 as the center, the webbing belt 20 is wound and accommodated on the outer peripheral portion of the spool 18, from longitudinal direction the base end side thereof. When the webbing belt 20 is pulled toward the front end side thereof, the webbing belt 20 wound on the spool 18 is extracted, and the spool 18 rotates in an extracting direction opposite to the winding direction.

On the other hand, a bar-shaped torsion shaft 24 of which the longitudinal direction is aligned with the axial direction of the spool 18 is disposed inside the spool 18. The torsion shaft 24 is connected to the spool 18 near the end portion of the spool 18 which is near the bridge plate 16 so as not to be rotatable with respect to the spool 18.

Further, a spool biasing means (not shown) such as a helical spring provided on the outside of the bridge plate 16 (that is, on one side of the bridge plate 16 which is the side not facing the bridge plate 14) is connected to the end portion of the torsion shaft 24 which is disposed on the bridge plate 16 side. When the torsion shaft 24 rotates in the extracting direction together with the spool 18, a biasing force is generated in the spool biasing means, and the biasing force is used to rotate the spool 18 in the winding direction via the torsion shaft 24. Accordingly, the webbing belt 20 may be wound on the spool 18.

On the other hand, a sensor holder 42 of a lock mechanism 40 is attached to the bridge plate 14 on the outside of the bridge plate 14 (that is, on one side of the bridge plate 14 which is the side not facing the bridge plate 16). The sensor holder 42 is formed in a concave shape that is partially open toward the bridge plate 14. A sensor cover (not shown) is provided to one side of the sensor holder 42 which is the side not facing the bridge plate 14. The sensor holder 42 is covered by the sensor cover and a shaft portion 46 extending from the other end side of the torsion shaft 24 and passing through the sensor holder 42 is rotatably and axially supported by the sensor cover.

Further, a V-gear 48 is provided on one side of the sensor holder 42 which is the side not facing the bridge plate 14 (that is, between the sensor holder 42 and the sensor cover). The V-gear 48 is wholly formed in a bottomed cylindrical shape (basin shape) having a shallow bottom and is open toward the side not facing the bridge plate 14 in the axial direction of the spool 18, and is coaxially and integrally attached to the shaft portion 46. A W pawl 50 as a clutch member is provided at a position spaced apart from the central axis line of the V-gear 48 in the radial direction of the V-gear 48. The base end side of the W pawl 50 is supported by the V-gear 48 so as to be swingable about an axis having an axial direction coincident with the direction of the central axis line of the V-gear 48, and when the W pawl 50 swings about the support position, the front end side thereof moves closer to or away from the outer edge of the V-gear 48.

In addition, an inertia mass 52 is provided as an inertia mass body. The inertia mass 52 is supported by the V-gear 48 so as to be swingable about the axis having an axial direction coincident with the direction of the central axis line of the V-gear 48. Likewise, in the inertia mass 52 supported by the V-gear 48, when the inertia mass 52 relatively rotates (swings) in the winding direction with respect to the V-gear 48, the inertia mass 52 presses the W pawl 50 so that the front end side of the W pawl 50 moves closer to the outer edge of the V-gear 48. In addition, a compressing coil spring 54 is provided on one side of the inertia mass 52. One end portion of the compressing coil spring 54 engages with the inertia mass 52 so that the inertia mass 52 is based in the extracting direction.

On the other hand, as shown in FIG. 1, a sensor gear 58 as a driving body and a rotation member is provided on at one side of the V-gear 48 which is the side not facing the bridge plate 14. The sensor gear 58 is formed in a bottomed cylindrical shape (basin shape) having a shallow bottom and is open toward one side of the sensor gear 58 which is the side not facing the bridge plate 14. The sensor gear 58 is rotatably supported by a cylindrical boss 60 formed at the V-gear 48 so that the shaft portion 46 passes therethrough. A return spring 62 is provided in the vicinity of the sensor gear 58. The return spring 62 is formed as a compressing coil spring or the like, and when the sensor gear 58 rotates in the extracting direction about the boss 60, a biasing force thereof increases so that the sensor gear 58 is biased in the winding direction.

A ratchet tooth (not shown) is formed at the inside of the sensor gear 58 so as to be coaxial with the boss 60. The ratchet tooth formed at the sensor gear 58 is disposed to intrude into the inside of the V-gear 48, and faces the W pawl 50 in the radial directions of the V-gear 48 and the sensor gear 58. When the front end side of the W pawl 50 rotates so as to move closer to the outer edge of the V-gear 48, the front end side of the W pawl 50 engages with the ratchet tooth of the sensor gear 58. As described above, the sensor gear 58 is rotatably supported by the boss 60 of the V-gear 48, but when the V-gear 48 rotates in the extracting direction while the front end side of the W pawl 50 engages with the ratchet tooth of the sensor gear 58, the ratchet tooth is pressed by the front end side of the W pawl 50 so that the sensor gear 58 rotates in the extracting direction together with the V-gear 48.

Further, a connection claw attachment portion 72 is formed at the sensor gear 58. A support shaft 74 is formed at the connection claw attachment portion 72 so that the axial direction thereof is aligned with the axial direction of the spool 18. A connection claw 76 is supported by the support shaft 74 so as to be rotatable about the support shaft 74.

When the connection claw 76 rotates about the support shaft 74, the front end thereof moves closer to or away from the outer peripheral portion of the V-gear 48. A ratchet tooth 78 is formed at the outer peripheral portion of the V-gear 48 so as to correspond to the connection claw 76, and when the connection claw 76 rotates so as to move closer to the outer peripheral portion of the V-gear 48, the front end of the connection claw 76 meshes with the ratchet tooth 78. In this state, when the V-gear 48 rotates in the extracting direction, the rotation of the V-gear 48 is transmitted to the sensor gear 58 via the ratchet tooth 78, the connection claw 76, the support shaft 74, and the connection claw attachment portion 72, and the sensor gear 58 rotates in the extracting direction.

An acceleration sensor 80 as an acceleration detecting means is provided on the sensor cover so as to be located below the connection claw 76. The acceleration sensor 80 includes a sensor frame 82. The sensor frame 82 is provided with a mounting portion 84. The mounting portion 84 is a curved surface which is curved so as to be open toward the substantially upper portion of the vehicle, and a hard ball 86 is placed on the mounting portion 84. A pressing-up piece 88 is provided on the upper side of the hard ball 86.

The pressing-up piece 88 is supported by the vertical wall which is formed upright from the sensor frame 82 so as to be rotatable about the axis having an axial direction substantially coincident with the longitudinal direction of the vehicle, and when the hard ball 86 rolls on the mounting portion 84 and ascends on the curved surface of the mounting portion 84, the hard ball 86 presses up the pressing-up piece 88. The pressing-up piece 88 that is pressed up in this way rotates about the connection portion which is connected with the vertical wall so that the front end side thereof moves upward. Since the connection claw 76 is located above the pressing-up piece 88, when the pressing-up piece 88 rotates so that the front end side of the pressing-up piece 88 moves upward, the connection claw 76 is pressed to be lifted upward by the front end of the pressing-up piece 88. Accordingly, the front end of the connection claw 76 meshes with the ratchet tooth 78.

On the other hand, a link member 94 as a driven body and a speed increasing transmission means is provided at one side of the sensor gear 58 which is the side facing the bridge plate 14, in the vicinity of the connection claw attachment portion 72. A support body 96 is attached to the bridge plate 14 of the frame 12 so as to correspond to the link member 94. A support shaft 98 is provided in the support body 96 so that the axial direction thereof is aligned with the direction of the central axis line of the spool 18. A cylindrical body 100 is formed at the link member 94 so as to allow the support shaft 98 to be fitted and inserted therethrough, and when the support shaft 98 is fitted and inserted into the cylindrical body 100, the link member 94 is supported so as to be rotatable about the support shaft 98.

An engagement pin 102 as a protrusion is formed at the link member 94. The engagement pin 102 protrudes toward the sensor gear 58 in a direction coincident with the axial direction of the spool 18 from the position spaced apart from the central axis line of the cylindrical body 100 as the rotation center of the link member 94 in the radial direction of the link member 94. A penetration hole 104 is formed at the sensor holder 42 so as to correspond to the engagement pin 102, and the engagement pin 102 passes through the penetration hole 104. The penetration hole 104 is formed in a circular-arc shape that is curved about the central axis line of the support shaft 98 and the cylindrical body 100. For this reason, even when the engagement pin 102 penetrates the penetration hole 104, the link member 94 may rotate about the support shaft 98 by a predetermined angle.

Figure 3:
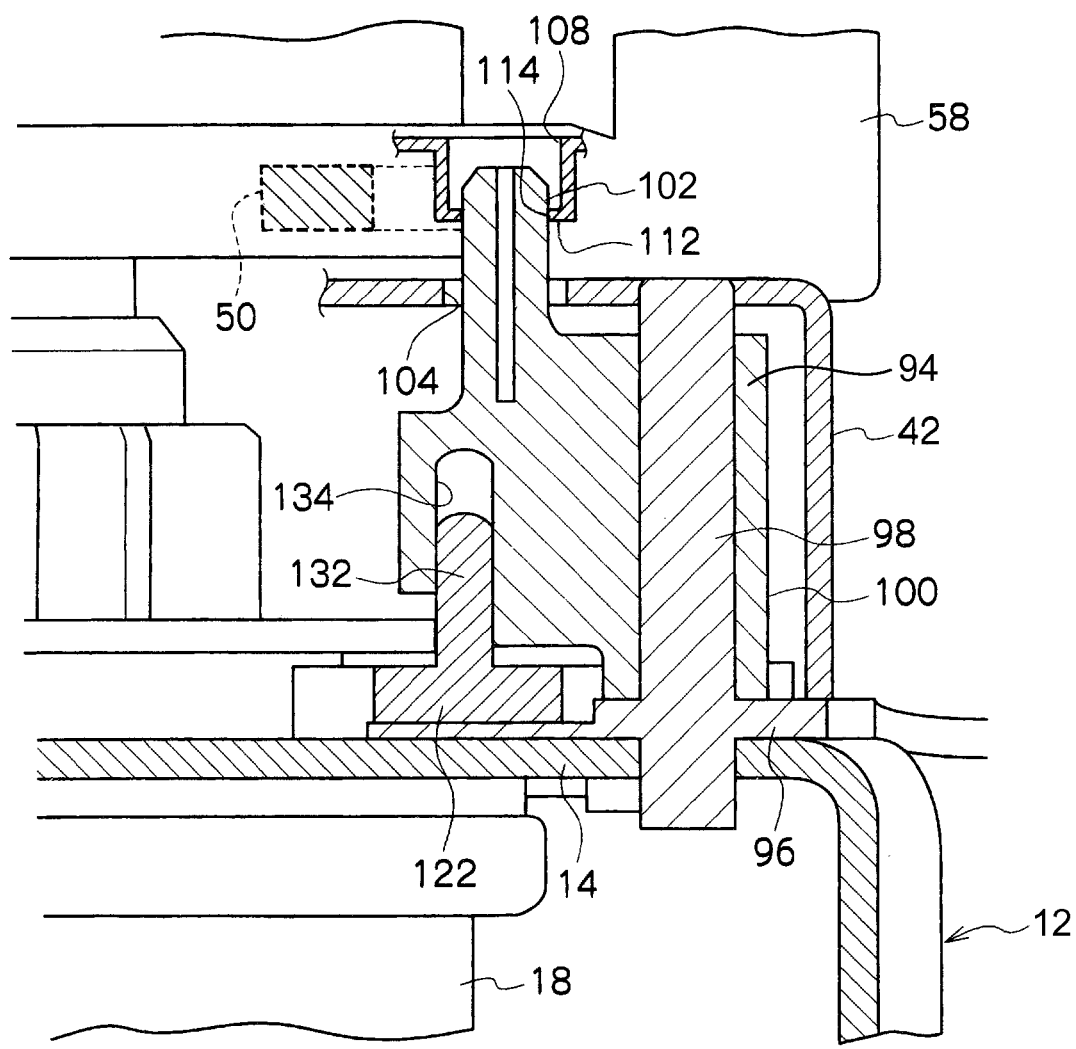
FIG. 3 is a rear cross-sectional view schematically illustrating a configuration of a main part of the webbing winding device according to the exemplary embodiment of the invention when viewed along the line 3-3 of FIG. 2.

As shown in FIG. 3, a penetration hole 108 having the inner peripheral shape sufficiently larger than the outer peripheral shape of the engagement pin 102 is formed at a predetermined portion of the sensor gear 58 so as to correspond to the engagement pin 102 passing through the penetration hole 104. A peripheral wall 110 as a connection portion is formed to extend from the edge portion of the penetration hole 108 toward the link member 94 side. The end portion of the peripheral wall 110 which is on the link member 94 side is provided with a bottom wall 112 as a hole defining wall.

The bottom wall 112 is provided at a position displaced in the radial direction of the V-gear 48 with respect to the W pawl 50. That is, in the exemplary embodiment, the W pawl 50 and the bottom wall 112 are located on substantially the same plane that is cut in the radial direction of the V-gear 48, and the position of the bottom wall 112 is set within a range of the thickness of the W pawl 50 in the axial direction of the spool 18. The bottom wall 112 is provided with a guide hole 114 as a hole, and the engagement pin 102 passes through the guide hole 114 at a position which is closer to the base end than the front end portion of the engagement pin 102. The guide hole 114 is formed as an elongated hole, and when the sensor gear 58 rotates about the central axis of the spool 18, the inner peripheral portion of the guide hole 114 presses the engagement pin 102 so that the link member 94 rotates about the support shaft 98.

Figure 2:
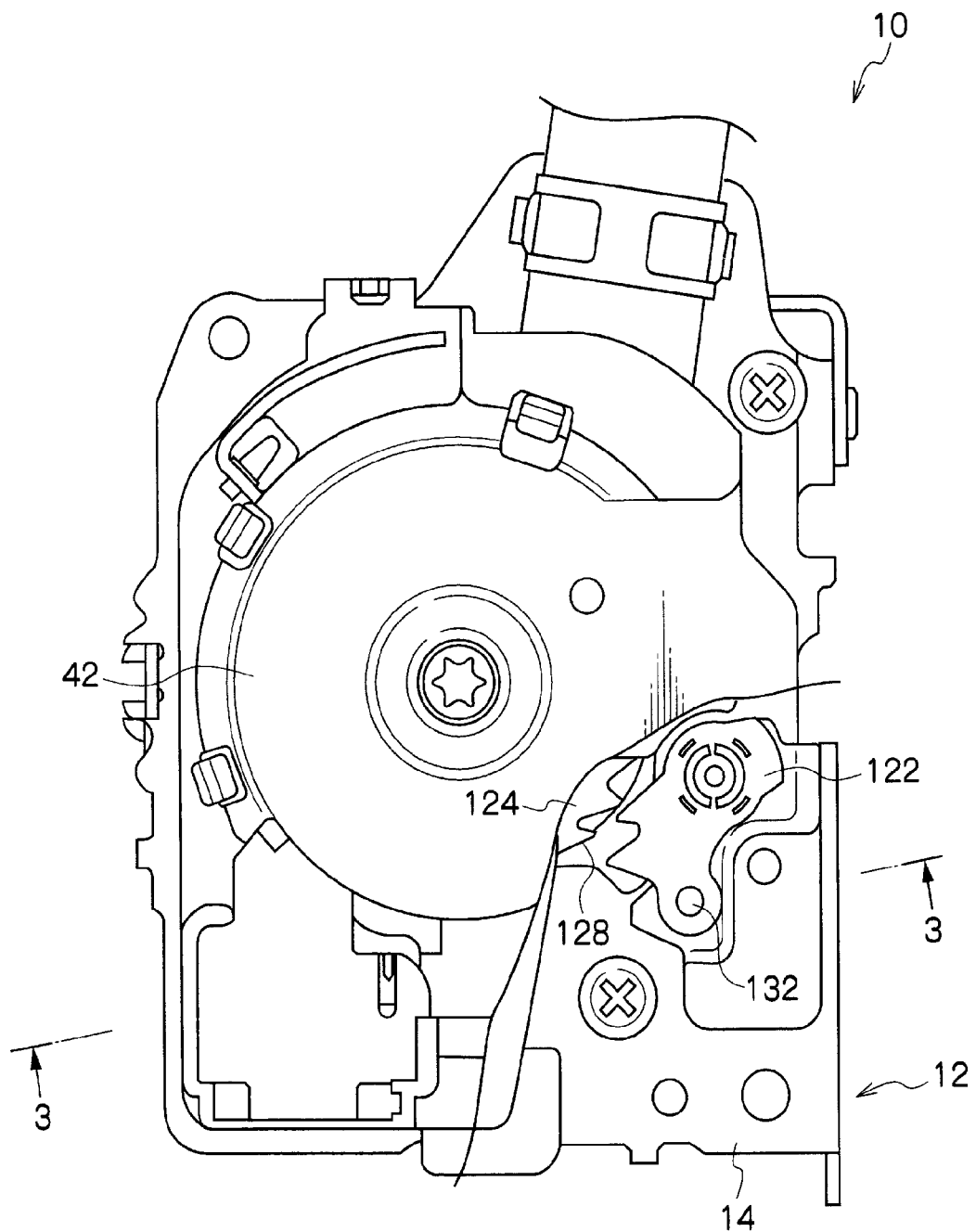
FIG. 2 is a side cross-sectional view schematically illustrating a lock mechanism and a peripheral portion thereof in the webbing winding device according to the exemplary embodiment of the invention.

On the other hand, as shown in FIGS. 1 and 2, a lock pawl 122 as a regulation member is supported by the support body 96 by an attachment pin 120 so as to be rotatable about the axis having an axial direction coincident with the axial direction of the support shaft 98. A lock base 124 is provided in the spool 18 so as to correspond to the lock pawl 122. A part of the lock base 124 is fitted and inserted into the opening end of the spool 18 which is on the bridge plate 14 side so as to be coaxially rotatable with respect to the spool 18. However, the torsion shaft 24 passes through the lock base 124 so as not to be relatively rotatable. For this reason, the lock base 124 is connected to the spool 18 via the torsion shaft 24 so as not to be relatively rotatable with respect to the spool 18.

Further, a ratchet tooth 128 is provided in the outer peripheral portion of the lock base 124. A ratchet tooth is formed at the lock pawl 122 so as to mesh with the ratchet tooth 128, and when the lock pawl 122 rotates in a direction in which the front end side of the lock pawl 122 moves closer to the outer peripheral portion of the ratchet tooth 128, the ratchet tooth of the lock pawl 122 meshes with the ratchet tooth 128 (lock base 124). Likewise, when the ratchet tooth of the lock pawl 122 meshes with the ratchet tooth 128 (lock base 124), the rotation of the lock base 124 in the extracting direction is regulated.

An engagement pin 132 is formed at the lock pawl 122 so as to be located at a position deviated from the rotation center of the lock pawl 122 in the radial direction thereof. The engagement pin 132 protrudes in a direction coincident with the axial direction of the spool 18 from the end surface of the lock pawl 122 which is on the link member 94 side. An elongated hole-shaped guide hole 134 is formed at the link member 94 so as to correspond to the engagement pin 132. The engagement pin 132 is inserted into the guide hole 134, and when the sensor gear 58 rotates in the extracting direction so that the engagement pin 102 is pressed by the inner peripheral portion of the guide hole 114 and the link member 94 rotates in the winding direction about the support shaft 98, the inner peripheral portion of the guide hole 134 presses the engagement pin 132, so that the lock pawl 122 is rotated and the ratchet tooth of the lock pawl 122 moves closer to the ratchet tooth 128 (lock base 124).

Here, the webbing winding device 10 has a configuration in which the rotation of the sensor gear 58 is transmitted to the lock pawl 122 via the link member 94 so as to rotate the lock pawl 122. However, the link member 94 is not a simple rotation transmission means. That is, the formation position of the engagement pin 102 with respect to the cylindrical body 100, which allows the support shaft 98 to be fitted and inserted thereto, or the formation position of the guide hole 134 with respect to the cylindrical body 100 is set in a manner of increasing the speed of rotation of the sensor gear 58 and transmitting the rotation of the sensor gear 58 to the lock pawl 122.

<Operation and Effect of Exemplary Embodiment>

Next, the operation and the effect of the webbing winding device 10 will be described.

In the webbing winding device 10, if a vehicle is rapidly decelerated and the hard ball 86 rolls toward the front side of the vehicle due to inertia while an occupant wears the webbing belt 20 extracted from the spool 18, the hard ball 86 ascends on the curved surface of the mounting portion 84, and the hard ball 86 presses up the pressing-up piece 88. The pressed pressing-up piece 88 engages with the connection claw 76 of the sensor gear 58, and rotates the connection claw 76 so as to be pressed upward. Accordingly, the connection claw 76 meshes with the ratchet tooth 78 of the V-gear 48.

On the other hand, when the occupant's body moves in the substantially forward direction of the vehicle due to inertia generated when the vehicle is decelerated, the webbing belt 20 is pulled by the occupant's body. Likewise, when the webbing belt 20 is pulled, the spool 18 rotates in the extracting direction. When the spool 18 rotates in the extracting direction, the torsion shaft 24 rotates in the extracting direction together with the spool 18, and the V-gear 48 rotates in the extracting direction. When the V-gear 48 rotates in the extracting direction in this way, the W pawl 50 and the inertia mass 52 basically rotate in the extracting direction together with the V-gear 48.

However, when the V-gear 48 rotates in the extracting direction at a predetermined acceleration or more, the inertia mass 52 tends to stay at the current position without being rotated by the inertia (that is, the inertia mass 52 may not come up with the rotation of the V-gear 48). As a result, a relative rotation occurs between the V-gear 48 rotating in the extracting direction and the inertia 52 moving failing in catching up with the rotation of the V-gear so as to resist the biasing force of the compressing coil spring 54, and the inertia mass 52 relatively rotates in the winding direction with respect to the V-gear 48.

When the relative rotation occurs in the inertia mass 52, the inertia mass 52 presses the W pawl 50, and rotates the W pawl 50 about the axis in the base end side thereof in a direction in which the front end side of the W pawl 50 moves closer to the outer peripheral edge of the V-gear 48. When the W pawl 50 rotates in this way, the front end side thereof moves closer to the ratchet tooth of the sensor gear 58 so as to mesh therewith.

As described above, when the V-gear 48 rotates in the extracting direction while the connection claw 76 meshes with the ratchet tooth 78 of the V-gear 48 or the front end side of the W pawl 50 meshes with the ratchet tooth of the sensor gear 58, the rotation of the V-gear 48 is transmitted to the sensor gear 58, and the sensor gear 58 rotates in the extracting direction together with the V-gear 48 while resisting the biasing force of the return spring 62.

When the sensor gear 58 rotates in the extracting direction in this way, the inner peripheral portion of the guide hole 114 formed at the sensor gear 58 presses the outer peripheral portion of the engagement pin 102 so as to rotate the link member 94 in the extracting direction. When the link member 94 rotates in the extracting direction, the inner peripheral portion of the guide hole 134 formed at the link member 94 presses the outer peripheral portion of the engagement pin 132 so as to rotate the lock pawl 122 in the winding direction. When the lock pawl 122 rotates in this way, the ratchet tooth of the lock pawl 122 meshes with the ratchet tooth 128 (lock base 124), so that the lock pawl 122 regulates the rotation of the lock base 124 in the extracting direction.

Since the lock base 124 is connected to the spool 18 via the torsion shaft 24 so as not to be relatively rotatable, the rotation of the lock base 124 in the extracting direction is regulated, and thus the rotation of the spool 18 in the extracting direction is also regulated. Accordingly, since the extraction of the webbing belt 20, starting from the spool 18, is regulated, for example, the occupant's body moving in the forward direction of the vehicle while the vehicle is rapidly decelerated may be strongly restrained by the webbing belt 20.

Here, for example, when the sensor gear 58 having the ratchet gear pressed by the W pawl 50 is rotated in the extracting direction by a gap required for the assembly of various components constituting the lock mechanism 40, the sensor gear 58 may be displaced so that the central axis line of the sensor gear 58 is inclined with respect to the central axis line of the V-gear 48. When the sensor gear 58 is displaced in this way, the penetration direction (opening direction) of the guide hole 114 is, of course, inclined.

However, in the engagement pin 102 inserted into the guide hole 114, since the base end side thereof in the protruding direction from the link member 94 passes through the guide hole 114, the front end side of the engagement pin 102 does not interfere with the inner peripheral portion of the guide hole 114 even when the guide hole 114 is inclined. Further, since the guide hole 114 is formed at the bottom wall 112, the outer peripheral portion of the front end of the engagement pin 102 is spaced apart from the inner peripheral portion of the peripheral wall 110 connected to the outer peripheral edge of the bottom wall 112. For this reason, even when the sensor gear 58 is displaced as described above, the front end side of the engagement pin 102 does not interfere with the inner peripheral portion of the peripheral wall 110.

Accordingly, when the link member 94 is not inclined (displaced) due to the displacement of the sensor gear 58 or even when the link member 94 is inclined (displaced) due to the displacement of the sensor gear 58, the inclination (displacement) may be minimized.

Further, in the link member 94 directly receiving the rotation force from the sensor gear 58, displacement in which the central axis line is inclined is suppressed by the support shaft 98 fitted to and inserted into the cylindrical body 100. For this reason, even when the sensor gear 58 is displaced so that the central axis line of the V-gear 48 is inclined with respect to the central axis line of the sensor gear 58 as described above, the link member 94 regulated by the support shaft 98 is scarcely inclined and influenced by the inclination of the sensor gear 58. Accordingly, rotation may be smoothly transmitted from the link member 94 to the lock pawl 122.

In the exemplary embodiment, the W pawl 50 and the bottom wall 112 are located on substantially the same plane which is cut in the rotation radial direction of the V-gear 48. Accordingly, the formation position of the guide hole 114, that is, the connection portion between the sensor gear 58 and the link member 94, is located on substantially the same plane cut in the rotation radial direction of the V-gear 48 with respect to the W pawl 50. In this structure, the transmission of the rotation force from the W pawl 50 to the engagement pin 102 (that is, the link member 94) via the sensor gear 58 is performed on substantially the same plane which is cut in the rotation radial direction of the V-gear 48 (that is, the transmission path of the rotation force is not displaced in the direction of the central axis line of the V-gear 48). For this reason, a difference in the transmission of the rotation force between the W pawl 50, the sensor gear 58, and the link member 94 may be suppressed.

In the exemplary embodiment, the elongated hole-shaped guide hole 114 is formed as a hole mentioned in claims. However, the hole is not limited to the elongated hole shape, and the opening shape may be round.

In the exemplary embodiment, the guide hole 114 as the hole is provided in the sensor gear 58 as the driving body, and the engagement pin 102 as the protrusion is provided in the link member 94 as the driven body. However, the protrusion may be provided in the sensor gear 58 as the driving body and the hole may be provided in the link member 94 as the driven body as long as the movement may be transmitted from the sensor gear 58 as the driving body to the link member 94 as the driven body.

In the exemplary embodiment, the peripheral wall 110 extends from the sensor gear 58 toward the link member 94, and the front end of the peripheral wall 110 is provided with the bottom wall 112 having the guide hole 114. As described above, in this configuration, since the guide hole 114 may move closer to the link member 94, even when the dimension of the protrusion of the engagement pin 102 is not particularly set to be long, the base end side of the engagement pin 102 may pass through the guide hole 114. However, from the viewpoint of the invention, the guide hole 114 may be formed at the sensor gear 58 without forming the peripheral wall 110 or the bottom wall 112 in the sensor gear 58.

In the exemplary embodiment, the invention is applied to the relationship between the link member 94 and the sensor gear 58 of the lock mechanism 40, but the invention is not limited to this configuration. For example, the invention may be applied to the relationship between the lock pawl 122 and the link member 94 on the assumption that the link member 94 is used as the driving body and the lock pawl 122 is used as the driven body. Alternatively, the invention may be applied to the relationship between the lock pawl 122 and the sensor gear 58 in the configuration in which the sensor gear 58 as the driving body moves the lock pawl 122 as the driven body without using the link member 94.

In the exemplary embodiment, the external ratchet tooth 128 is formed at the lock base 124, and the outer radial side of the ratchet tooth 128 meshes with the lock pawl 122 so as to regulate the rotation of the spool 18 in the extracting direction. However, the ratchet hole having an internal tooth may be formed at the bridge wall of the frame, and the lock pawl formed at the lock base may mesh with the internal tooth of the ratchet hole formed at the bridge wall so as to regulate the rotation of the spool in the extracting direction. The invention may be applied to the lock mechanism of the webbing winding device with this configuration.

What is claimed is:

1. A webbing winding device comprising:
    a spool that fixes a base end portion of an elongated webbing belt in a longitudinal direction, and rotates in a winding direction so as to allow the webbing belt to wind around the spool from the base end portion of the webbing belt in the longitudinal direction;
    a regulation member that rotates, so as to directly or indirectly engage with the spool, by a predetermined angle toward a position at which the regulation member directly or indirectly engages with the spool, and that regulates the rotation of the spool in an extracting direction opposite to the winding direction;
    a rotation member that is operated to connect the spool and the rotation member in a connection state of at least one of two cases, one case being a case in which the spool rotates in the extracting direction at a predetermined spool acceleration or more in accordance with extraction of the webbing belt from the spool and the other case being a case in which a vehicle is decelerated at a predetermined vehicle acceleration or more, and that rotates in a predetermined direction in accordance with rotation transmitted from the spool in the connection state; and
    a link member that directly contacts the regulation member and mechanically connects the rotation member and the regulation member to each other, and transmits rotation of the rotation member in the extracting direction to the regulation member so as to rotate the regulation member in a direction of enabling direct or indirect engagement with the spool.

2. The webbing winding device of claim 1, further comprising:
    a protrusion that is formed at one of a driving body or a driven body to protrude therefrom toward the other of the driving body or the driven body, the driving body being disposed on one of the rotation member, the link member, or the regulation member at an upstream side relative to the rotation transmission, and the driven body being rotated by rotation directly transmitted from the driving body; and
    a hole that is formed at the other of the driving body or the driven body so that the protrusion is inserted into the hole,
    wherein the protrusion or the hole is provided so that an inner peripheral portion of the hole contacts an outer peripheral portion of the protrusion at a base end portion of the protrusion rather than a front end portion of the protrusion.

3. The webbing winding device of claim 2, further comprising:
    a hole defining wall that is formed at the hole; and
    a connection portion that is formed at the one of the driving body or the driven body that has the hole so as to be directed toward the one of the driving body or the driven body that has the protrusion, the hole defining wall being formed at a front end side of the connection portion rather than a base end portion of the connection portion,
    wherein the connection portion is provided such that the connection portion is spaced apart from the outer peripheral portion of the protrusion passing through the hole.

4. The webbing winding device of claim 2, further comprising:
    a clutch member that is operated to connect the spool and the rotation member to each other when a vehicle is decelerated at the predetermined vehicle acceleration or more or the spool rotates in the extracting direction at the predetermined spool acceleration or more,
    wherein a connection position of the driving body and the driven body is set within a range of the thickness of the clutch member.

5. The webbing winding device of claim 1, further comprising a frame that rotatably supports the spool, and a support shaft connected to the frame that rotatably supports the link member.

* * * * *